United States Patent [19]

Brotea et al.

[11] Patent Number: 4,795,556

[45] Date of Patent: Jan. 3, 1989

[54] WATER REMOVAL DEVICE FOR FUEL SYSTEMS

[76] Inventors: Paul A. Brotea, 1091 Gilliard La., Ventura, Calif. 93001; Robert J. Tufts, 728 Colina Vista, Ventura, Calif. 93003

[21] Appl. No.: 61,495

[22] Filed: Jun. 15, 1987

[51] Int. Cl.$^4$ .............................................. B01D 17/02
[52] U.S. Cl. ............................ 210/172; 210/DIG. 6; 210/266; 55/388; 55/275; 55/316; 123/510
[58] Field of Search ................ 210/DIG. 6, DIG. 7, 210/262, 446, 266, 317, 172; 55/388, 275, 316; 123/510

[56] References Cited

U.S. PATENT DOCUMENTS

| | | | |
|---|---|---|---|
| 1,839,350 | 1/1932 | Slagel | 210/266 |
| 2,260,608 | 10/1941 | Cormack | 210/DIG. 6 |
| 2,469,842 | 5/1949 | Paquin et al. | 210/DIG. 4 |
| 2,551,426 | 5/1951 | Eaker | 210/DIG. 6 |
| 3,505,783 | 4/1970 | Graham | 55/275 |
| 4,334,989 | 6/1982 | Hall | 210/262 |
| 4,515,133 | 5/1985 | Roman | 210/446 |

*Primary Examiner*—Bernard Nozick
*Attorney, Agent, or Firm*—Norman E. Reitz

[57] ABSTRACT

A water removal device for placement in the fuel line of an hydrocarbon fueled engine between the fuel tank and the engine. The device includes a hermetically sealed housing which has an inlet end and an outlet end, respectively, for receiving and discharging flowing fuel. Within the interior of the housing a quantity of hygroscopic material is tightly packed. The grain size and shape of the grains of the material is selected so that substantially no particulate matter will enter the fuel stream. In a preferred embodiment conventional filters are utilized downstream of the device. A screen filter or filter made from a fibrous material may be used upstream of the device. Also, a screen may be attached within the housing adjacent the inlet and outlet ends to prevent granules of the hygroscopic material from passing out of the device and into the fuel stream. A viewing port may be incorporated in the housing to allow the operator of the vehicle to visually determine whether the chemical needs replacement. A water sensitive dye may be incorporated into a portion of the granules to aid the operator in making the determination.

16 Claims, 2 Drawing Sheets

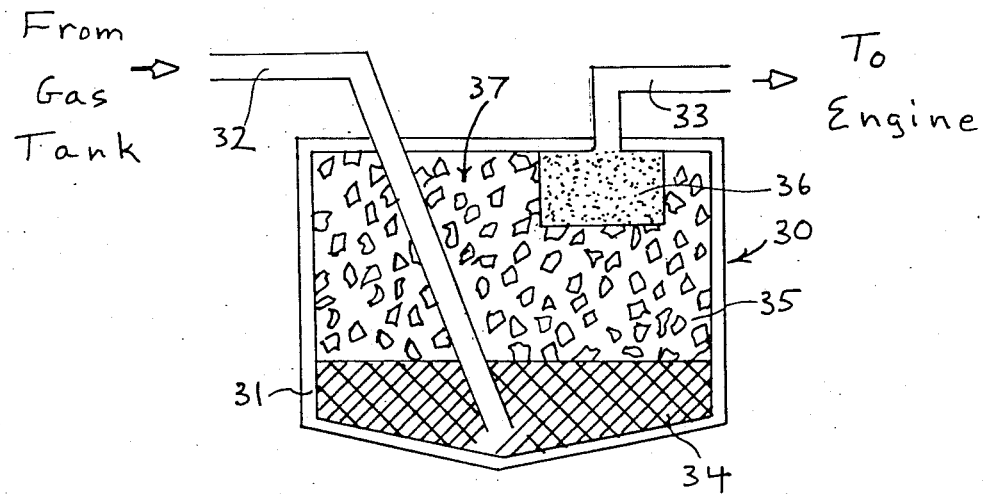
FIG 5
FIG 6
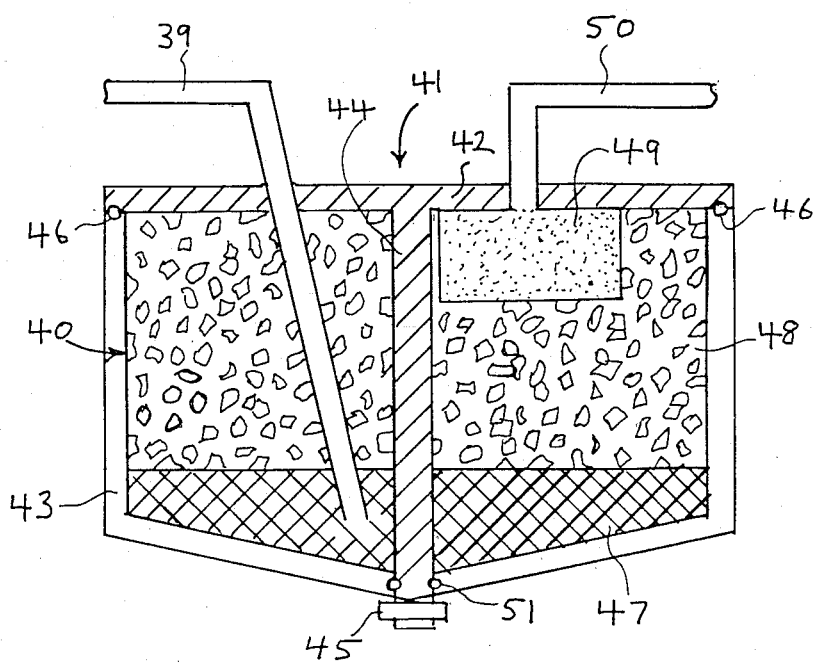

WATER REMOVAL DEVICE FOR FUEL SYSTEMS

This invention relates to a device for removing water from a stream of liquid fuel and, more particularly, relates to an in-line filter system for removing water from hydrocarbon liquid fuels in stream.

There are numerous sources of water contamination in hydrocarbon liquid fuels. When petroleum is removed from the ground a trace amount of water may be incorporated; this amount may be increased if steam injection has been used in the recovery process. In addition, since oil refineries utilize sulphuric acid and other chemicals in their catalytic cracking processes, water may be used subsequently to extract chemical additives such as sulfur trioxide from the petroleum products. This purification is necessary to remove chemicals which would contribute to air pollution if combusted. However, the water that is added is never completely removed due to the prohibitive expense that would be incurred. Also, water may seep into gasolene storage tanks or may form as condensation in storage tanks or delivery trucks. Finally, when gasolene or other liquid fuels are placed in the tanks of vehicles, water may form through condensation or may be inadvertently added in other ways. As a result, virtually all liquid fuel used to power motor vehicles contains a fractional amount of water when it is introduced into the engine for combustion.

Engine performance is adversely affected when water even in trace amounts is found in the fuel. For example, since ice may form in fuel lines and cause engine malfunction, in the operation of aircraft water detectors are utilized so that water may be detected and may be drained from the tank before takeoff or, if a plane is in flight, alternate fuel tanks may be used. See, for example, the A.I.R. Water Detector available from AIR Components Co., P.O. Box 328, Florence, Oreg. 97439. With land-based vehicles when water is mixed in with the fuel, the problems to be noticed include roughness in engine operation, loss of power, and poor starting ability. These problems are especially acute when an engine is started cold and during the warm-up period for the first several minutes. Water which settles to the bottom of the fuel tank is drawn into the fuel stream first when an engine is started so the water/fuel ratio is higher and the adverse effects are greater. Thus, the engine will not operate at peak efficiency during its first few minutes of operation, and any fuel problem will be even more pronounced during that time. Over the long term, however, the other more serious problem caused by water in the fuel is the deterioration of components used in the fuel system such as the fuel pump, fuel distributor, carburetors, fuel injectors, warm up regulators, fuel fittings, fuel lines and all other components fabricated from metals of a highly reactive nature, through the process of corrosion.

The mechanisms of reaction with water have been much studied. For example, see "Corrosion", Chapter 19 in Theodore L. Brown and H. Eugene LeMay, *Chemistry The Central Science*, (Prentice-Hall 1977).

The research indicates that a small amount of water can produce a significant amount of corrosion. Thus, even in a fuel system which is sealed from the air, the activity of the water molecules will allow oxygen dissolved in the fuel to react with interior metal surfaces of fuel tanks, the metal surfaces of carburetors, the nozzle of fuel injectors, and with all of the previously mentioned components. Corrosive reactions within the working components of internal combustion engines can cause such problems as rust, clogged fuel components, fuel pumps that freeze up, fuel injectors that operate at less than optimum design capacity—all of which will adversely affect engine performance. These problems have become particularly troublesome and costly in recent years as engines have become more complex, some using computers to run fuel systems and ignition systems concurrently. Even small amounts of water in fuel will have delayed effects. Once water is introduced into the system it tends to remain and will cause damage to the fuel system components during the ensuing months and years.

While water could be entirely removed from fuel at the refinery or even at the local gas station, water could still contaminate the fuel before it is combusted in the engine since it can collect by condensation in the vehicle's fuel tank or be added in several other ways. Thus, the best way to remove water from the fuel burned in internal combustion engines is to extract it from the fuel just before it is being burned. This is best accomplished by a filter system located in-line between the fuel tank and the working components of the fuel system. Several mechanical devices have been proposed for this purpose. The spin filter of Racor Industries, Inc., P.O. Box 3208, Modesto, Calif. 95353, uses centrifugal force to separate water from the relatively lighter fuel and gravity pulls the water down to the lower area of the filter. See Information Brochure for Raycor Part No. 7262. Gravity separation is disclosed as a means of removing water from fuel in S. H. Copeland, "Filter Device For Diesel Engines", U.S. Pat. No. 4,017,397. Honda Corporation of Japan has distributed a mechanical filter to remove water from diesel fuel by means of gravity and a paper filter element. Other devices are also currently being used worldwide. These devices either have not been fully efficient at removing water, have been unduely expensive, require special application design, or necessitate frequent maintenance. None of the above mentioned devices, nor any other used today to filter hydrocarbon liquid fuels are fully efficient in removing water from fuel in stream because there is no way for them to attract water and hold it, with the exception of paper type elements. Paper elements attract water, but are very inefficient. They will only remove a very small percentage of their weight in water, on the order of four (4) percent. Paper elements also clog very easily because the water will form a film which impedes fuel flow through the paper. Other filters rely on centrifugal force to spin water out of fuel. The water is then drawn to bottom of the filter by gravity. This process does not remove all trace amounts of water out of solution. In another approach fuel flows through a chemically treated fibrous filter which repels water. Water is then allowed to settle to the bottom via gravity. Again, trace elements of water are not removed from solution. None of these above mentioned devices or processes attracts and holds substantially all water entrained in hydrocarbon liquid fuels.

In view of the above background it is evident that it would be highly desirable to provide a device for effectively removing water from a vehicle's fuel system in a cost effective manner, with no maintenance required and with less specific design requirements for applications.

SUMMARY OF THE INVENTION

A water removal device is provided for placement in the fuel line of a hydrocarbon fueled engine between the fuel tank and the engine. The device includes a hermetically sealed housing which has an inlet end and an outlet end, respectively, for receiving and discharging flowing fuel. Within the interior of the housing a quantity of hygroscopic material is tightly packed. The grain size and shape of the grains of the material is selected so that substantially no particulate matter will enter the fuel stream. In a preferred embodiment conventional filters are utilized on either side of the device. Most preferredly, a paper filter is not used upstream of the device so that water will not clog the paper thereby slowing the flow of fuel or stopping it completely before it reaches the water removal device. Thus, a screen filter or filter of a fibrous material is most preferredly used upstream of the device. Also, a screen may be attached within the housing adjacent the inlet and outlet ends to prevent granules of the hygroscopic material from passing out of the device and into the fuel stream. In a preferred embodiment, a viewing port is incorporated in the housing to allow the operator of the vehicle to visually determine the state of the chemical, i.e. to determine whether the chemical needs to be replaced. A water sensitive dye may be incorporated into a portion of the granules to aid the operator in making the determination.

BRIEF DESCRIPTION OF THE DRAWINGS

For a more complete understanding of the water removal device of the present invention reference may be had to the accompanying drawings which are incorporated herein by reference and in which:

FIG. 5 is a cross sectional view taken through an alternate configuration for the device of the present invention;

FIG. 6 is a side view of a variation of the embodiment of FIG. 2 in which a replaceable cartridge is seated within a permanent housing.

DESCRIPTION OF THE PREFERRED EMBODIMENTS

The classes of materials which possess hygroscopic properties are well known. They include materials which dissolve in water and materials which have a capacity to bind water without changing state; the latter group of materials is preferred for the application of removing water from fuel. See, e.g., "Hygroscopic Materials", in The Condensed Chemical Dictionary, revised by Gessner G. Hawley [Van Nostrand Reynolds 1977]. In order for a hygroscopic material to be used in removing water from liquid fuels it is necessary that the material not react with the fuel, not readily disintegrate into small particles, be relatively abundant and inexpensive, and be nontoxic and inert to chemical combustion. Preferred materials include Calcium Sulfate Hydrate [$CaSO_4 \cdot 2H_2O$], and Calcium Chloride [$CaCl_2$]. These materials are selected from the following Table of Drying Agents in which drying agents suitable for use in the device of the present invention are listed in descending order of preference.

| TABLE of DRYING AGENTS | |
| --- | --- |
| Drying Agent | Chemical Formula |
| Calcium Sulfate | $CaSO_4$ |
| Calcium Sulfate Hydrate | $CaSO_4 \cdot 2H_2O$ |
| Calcium Chloride | $CaCl_2$ |
| Barium Oxide | $BaO$ |
| Calcium Oxide | $CaO$ |
| Zinc Chloride | $ZNCl_2$ |
| Zinc Bromide | $ZnBr_2$ |

These materials are preferred because they will not melt or react at the temperatures experienced in normal fuel system operation, are solids around which the fuel may pass or flow, and will not dissolve in hydrocarbon fuels. Also, their efficiency is virtually temperature-independent. Thus, even though the amount of water entrained in liquid fuel may vary with temperature, the effectiveness of these materials will remain essentialy constant.

Figure 1:
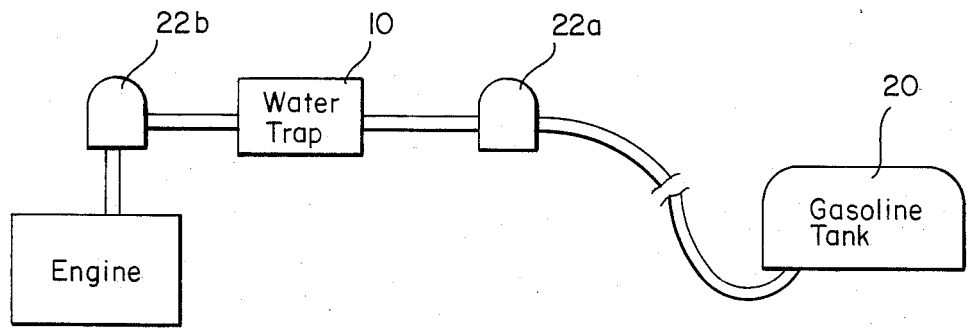
FIG. 1 is a side view of a fuel system in an internal combustion engine which incorporates the water removal device of the present invention.
Figure 2:
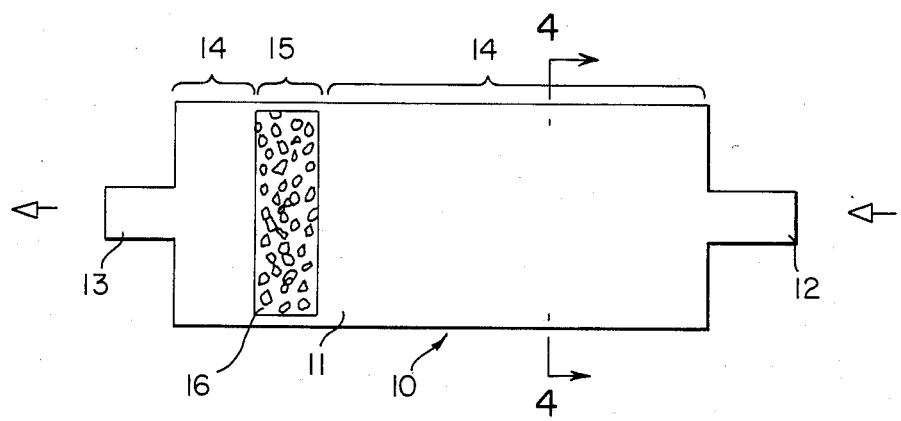
FIG. 2 is a close-up side view of a water removal device in accordance with the present invention.

The structure of the device of the present invention can be seen by reference to FIG. 2. In FIG. 2, the water removal evice 10 is shown to be comprised of cylindrical housing 11 having an inlet end 12 and an outlet end 13. The device is configured for inclusion in the fuel line of an internal combustion engine, as shown in FIG. 1 [discussed subsequently]. It is preferred that the cylindrical housing 11 be fabricated from an inert plastic such as VALOX DR 51, VALOX 735, VALOX 815, ULTEM, or polycarbonate and be opaque, as indicated by sections 14, but a portion of the housing, shown by section 15, may be polished so as to be transparent. The transparent section 15 allows the granules 16, at least some of which have been treated with a color sensitive dye, to be visually inspected by the operator of the vehicle to allow a determination whether they need to be replaced. This dye should be insoluble in the liquid fuel being used and should be color-stable except for being reactive with water. This dye may be selected from the class of inorganic salts which are water sensitive or, more preferrably from the class of organic dyes which are water sensitive.

Figure 3:
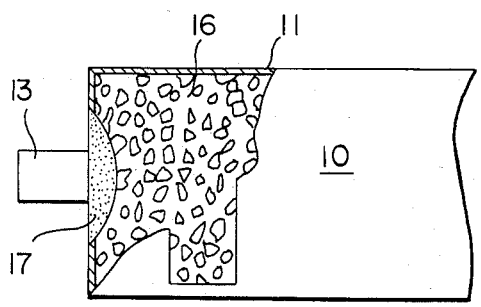
FIG. 3 is an breakaway view of the interior volume of the outlet end of the device of FIG. 2.
Figure 4:
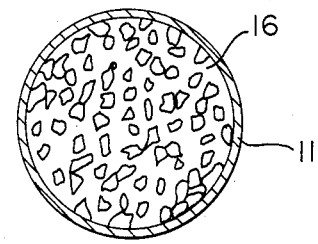
FIG. 4. is a cross sectional view taken through lines 4—4 of FIG. 2.

As fuel flows through the device 10 of the present invention it contacts the granules 16 which are tightly packed within the housing 11. This is illustrated in the cross sectional view of FIG. 4. It has been found that a mesh 8 size of $CaSO_4 \cdot 2H_2O$ will not unduly impede the flow of fuel and will remove water from the flowing fuel with high efficiency. Smaller mesh sizes may constrict the flow of fuel to an unacceptable degree; larger mesh sizes may not allow sufficient contact between the water entrained in the flowing fuel and the surfaces of the granules to remove all the water. Since the force of the flow is from the inlet end towards the outlet end, it is most likely that granules of the chemical would be swept towards the outlet end. However, to prevent the introduction of any such particles into the carburetor, fuel pump, fuel lines or other components of the fuel system either upstream or downstream from the device of the present invention a screen 17 is preferably affixed over the outlet end and over the inlet end of the device to prevent particles of appreciable size from exiting the device. In FIG. 3, the screen 17 is shown in place over the outlet end. The mesh size of this screen should not be so small that it can easily become clogged by a layer of the chemical used to remove water. In addition, as shown in FIG. 1, a conventional fuel filter 22b, such as any paper filter device commonly in use today, can be incorporated in the fuel line downstream from the device, with no adverse effect on the operation of the device of the present invention. Upstream of the device, a fuel filter 22a can be incorporated in the fuel line. Most preferredly, this filter is not composed of paper but of a fibrous material or of wire screen mesh.

An alternate embodiment 30 of the device of the present invention is shown in FIG. 5. The fuel from the fuel tank is introduced through an inlet tube 32 into a filter network 34 located in the lowermost area of the housing 31. The network 34 is composed of a mesh screen, possibly of plastic or nylon and will prevent large contaminant particles from reaching the dehydration area 37, and may hold some water since the water will be heavier than the fuel and will tend to settle to the bottom of housing 31. A charge of hygroscopic material 35 fills the upper volume of the housing 31. An amount of the hygroscopic material 35 may be chemically colored to show then the material has contained a sufficient amount of water to warrant replacement of the device. As discussed with respect to FIG. 2 the mesh of the granules is small enough to allow effective contact between the material and the fuel but not so tight that the flow of the fuel is unduely constricted. As the fuel fills the pores of the network 34 and the openings of the packed hygroscopic material 35 it will rise to the region of the screen 36 and pass out through the outlet tube 33 and thence to the engine. This embodiment is preferred for applications of larger water contamination. Water is visible in the bottom, and since water is heavier than the hydrocarbon liquid fuel, an amount will remain in the lower visible area because it will be held there by gravity.

In FIG. 6 a slip-in cartridge 40 is shown to be held within a permanent housing 41 consisting of a cover 42 which fits over the cup-shaped member 43. The stem 44 which depends from the underside of the cover 42 is threaded at its lower end so as to allow the nut 45 to engage therewith and draw the cover 42 firmly down onto the cup-shaped member 43. The O-ring 46 fits into a slot between the cover 42 and the member 43 and produces a hermetic seal when the nut 45 is tightened against the bottom of the cup-shaped member 43. A filter network 47 composed, e.g. of a plastic mesh, is located at the bottom of the cup-shaped member 43, to first receive the fuel from the gasolene tank. The fuel will then rise up through the hygroscopic material 48 contained within the housing 41, will flow up through the screen 49 and out the exit tube 50. As with the water removal device of FIG. 2, a portion of the cup-shaped member 43 or of the cover 42 may be transparent to permit the operator to observe the condition of the hygroscopic material. When the hygroscopic material is in need of replacement, the nut 45 is screwed off the end of the stem 44, the cover 42 is removed and the replaceable cartridge 41 is removed and a new cartridge with fresh hygroscopic material is put in place. Additional O-ring 51 may be located around the stem 44 as it journals through the bottom of the cup-shaped member 43 in order to maintain the hermetic seal for the device.

We claim:

1. A device for filtering and drying hydrocarbon liquid fuels, comprising:
    a housing;
    an inlet attached to one end of said housing, said inlet being in liquid-tight communication with a source of hydrocarbon liquid fuel;
    an outlet attached to another end of said housing, said outlet being in liquid-tight communication with the fuel intake of an internal combustion engine;
    a quantity of hygroscopic material packed within said housing; and
    a screen affixed within the interior of said housing adjacent said outlet to prevent the passage of any particulate matter such as said hygroscopic material to said fuel intake of said internal combustion engine.

2. A device in accordance with claim 1 wherein said housing also has a screen affixed within its interior adjacent said inlet end to prevent the passage of any particulate matter into said source of hydrocarbon liquid fuel.

3. A device in accordance with claim 1 wherein said hygroscopic material is Calcium Sulfate Hydrate [$CaSO_4:2H_2O$].

4. A device in accordance with claim 1 wherein said hygroscopic material is Calcium Chloride [$CaCl_4$].

5. A device in accordance with claim 1 wherein said hygroscopic material is Barium Oxide [$BaO$].

6. A device in accordance with claim 1 wherein said hygroscopic material is Calcium Oxide [$CaO$].

7. A device in accordance with claim 1 wherein said hygroscopic material is Zinc Oxide [$ZnO$].

8. A device in accordance with claim 1 wherein said hygroscopic material is Zinc Chloride [$ZnCl_2$].

9. A device in accordance with claim 1 wherein said hygroscopic material is Zinc Bromide [$ZnBr_2$].

10. A device for filtering and drying hyudrocarbon liquid fuels in accordance with claim 1 wherein said hygroscopic material is contained in a slip-in cartridge.

11. A device in accordance with claim 10 wherein said housing comprises a cup-shaped member, a cover which seats over said cup-shaped member and an O-ring which fits inbetween said cover and said member.

12. A device in accordance with claim 11 in wherein a fibrous filter material fills the bottom of said cup-shaped member.

13. A device in accordance with claim 1 wherein said housing is opaque everywhere except for a transparent section adjacent its outlet end which allows a person to view the state of the hygroscopic material.

14. A device in accordance with claim 13 in combination with a water sensitive dye admixed with said hygroscopic material.

15. A device in accordance with claim 1 in combination with a fibrous filter material within said housing adjacent said inlet end to filter solid matter from aid fuel before said fuel is introduced to said hygroscopic material.

16. A device in accordance with claim 15 in combination with a fibrous filter material within said housing adjacent said outlet end to filter solid matter from said fuel before said fuel in discharged into said fuel intake.

* * * * *